United States Patent [19]

Bolt et al.

[11] 3,735,107

[45] May 22, 1973

[54] CODED DECIMAL DIVIDER WITH PRE-CONDITIONING OF DIVISOR

[75] Inventors: Durk Jan Bolt; Jogchum Reitsma, both of Beekbergen, Netherlands

[73] Assignee: U.S. Philips Corporation, New York, N.Y.

[22] Filed: Jan. 26, 1972

[21] Appl. No.: 220,979

[30] Foreign Application Priority Data

Jan. 30, 1971 Netherlands ........................7101258

[52] U.S. Cl.....................................................235/159
[51] Int. Cl.....................................................G06f 7/52
[58] Field of Search...............................235/159, 160

[56] References Cited

UNITED STATES PATENTS

| | | | |
|---|---|---|---|
| 3,234,366 | 2/1966 | Davis et al. | 235/159 X |
| 3,578,961 | 5/1971 | Ming-tzev Miu | 235/159 |

OTHER PUBLICATIONS

I. Flores, The Logic of Computer Arithmetic 1963 pp. 247 & 280–294.

*Primary Examiner*—Malcolm A. Morrison
*Assistant Examiner*—David H. Malzahn
*Attorney*—Frank R. Trifari

[57] ABSTRACT

A calculating device for dividing decimal numbers according to the method of division without restoration of the remainder, comprising means for determining, prior to the start of the dividing process, whether the divisor digit present in the tetrade of the highest order less one of the divisor tetrade register (a 0 is present in the divisor tetrade of the highest order) is smaller than 5. If this is the case, these means produce a command for multiplying the dividend and the divisor, such that, said divisor digit becomes larger than or at least equal to 5. The said means provide a shift command during the dividing process, so as to shift the remainder present in the calculating unit over a number of digit tetrades of a higher order, this number being at least equal to one, in the dividend tetrade register, and for storing a corresponding number of quotient digits in the quotient digit tetrade(s) of the lowest order in the quotient tetrade register. The said number of digit tetrades is determined by the number, or number reduced by one, respectively, of zeros or nines of the remainder which preceeds the number <5 or ≧ 5, or ≧ 5 or <5, respectively. A modification of the device enables direct and automatic formation of the correct quotient digits.

3 Claims, 5 Drawing Figures

CODED DECIMAL DIVIDER WITH PRE-CONDITIONING OF DIVISOR

The invention relates to a calculating device for dividing decimal numbers according to the method of division without restoration of the remainder. The device comprises a divisor tetrade register for storing the divisor digits, the divisor digit of the highest order being a 0. A dividend tetrade register is provided for storing the dividend digits or, after a subtraction or an addition of the divisor, for storing the remainder digits. A quotient tetrade register is provided for storing the quotient digits. The device furthermore comprises a calculating unit and a control unit which supplies, if the dividend or a remainder is positive, a command to the calculating unit for performing a subtraction of the contents of the divisor tetrade register from the contents of the dividend tetrade register, or, if a remainder is negative, a command for performing an addition of the contents of the divisor tetrade register to the contents of the dividend tetrade register.

Calculating devices of this kind for dividing decimal numbers are well-known. Also known are methods of accelerating the dividing process, thus reducing the calculating time in a computer. The calculating device according to the invention, also has for its objects, to shorten the dividing process, simplifying the set-up of the dividing process providing a device which is uncomplicated. In order to achieve these objects, the calculating device for the division of decimal numbers according to the invention, comprises means for establishing, prior to the start of the dividing process, whether the divisor digit present in the tetrade of the highest order less one of the divisor tetrade register is smaller than 5. These means, if this is the case, supply a command for the multiplication of the dividend and the divisor by a given factor, such that, after one or more multiplication operations, the said divisor digit is larger than or at least equal to 5 means are provided which supply, if a remainder is $< 05$ or $\geq 95$, respectively, a shift command during the dividing process, for shifting the remainder into a digit tetrade of a higher order, and for shifting the associated quotient digit into the tetrade of the lowest order of the quotient tetrade register. A remainder is to be understood to mean an intermediate result of the division, after a subtract/add operation, or also after a shift. The pre-conditioning preceding the actual dividing process can be effected according to the normal multiplication process, which can be performed in any computer.

Additional time is required for the pre-conditioning of the divisor according to the invention and, in order to retain a proper quotient result of the division. Also additional time is needed for the multiplication of the dividend by the given factor. This multiplication has to be effected only once every complete division, and then only if the said divisor digit is smaller than the number 5. It is important that the number of add or subtract operations and also the number of times that a remainder is shifted per quotient digit to be formed, (there may be many quotient digits) is as small as possible. This is particularly the case, if an above-mentioned shift command, according to a further aspect of the invention, serves for shifting a remainder produced in the calculating unit over a number of digit tetrades of a higher order in the dividend tetrade register, and for simultaneously shifting a corresponding number of associated quotient digits in the quotient digit tetrades of the lowest order in the quotient tetrade register. The maximum number of digit tetrades are then equal to the number of digits of the digits of the highest order of the remainder containing a digit 0 followed by a digit which is smaller than 5, or containing a digit 9 followed by a digit which is larger than or equal to 5. The maximum number of digit tetrades are equal to the number of digits of the digits of the highest order, reduced by one, of the remainder containing a digit 0 followed by a digit which is larger than or equal to 5, or containing a digit 9 followed by a digit which is smaller than 5.

The formation, according to the invention, of a shift command when dividend values or remainder values occur which are smaller than given numbers 05 or larger than or equal to given numbers 95, respectively, and hence are also 005 or 995, respectively, implies that for the formation of the quotient digits the remainder passes through 0 substantially less often, so that substantially fewer add/subtract operations are required. It is to be noted, that other numbers might also be chosen, for example, 04 (in that case the divisor must first be pre-conditioned to at least 4) or 96, respectively. In that case however, when passing through 0, complications would occur, requiring special steps so as to achieve a small number of add/subtract operations. These steps, however, would make the device substantially more complicated. Other devices are also known in which still fewer operations are necessary, but these devices are much more complicated and much more extensive. By a small modification of the device according to the invention, it is additionally possible to form the correct quotient digits automatically without the dividing process, and hence the calculating device does not become more complicated. In order to realize this, the calculating device according to the invention is characterized in that the divisor tetrade register comprises an additional tetrade in the location whose order is one higher than the location of the divisor digit of the highest order (0). A digit 9 is permanently stored in the additional tetrade. The dividend tetrade register comprises an additional tetrade in the location whose order is one higher than the location of the dividend (remainder) digit of the highest order, a digit 0 being stored in the latter additional tetrade at the start of a division. The correct quotient digit is automatically formed by the add or subtract operations in the calculating unit in which the contents of said additional tetrades are also involved, said quotient digit being shifted into the quotient tetrade register following a shift command. As the contents of said additional tetrades are normally involved in the process of adding and subtracting, the desired quotient digits are automatically formed in succession without any special measures being required, it being readily possible to shift these quotient digits into the quotient tetrade register in reaction to a shift command from the calculating unit.

In order that the invention may be readily carried into effect, one embodiment thereof will now be described in detail, by way of example, with reference to the accompanying diagrammatic drawings, in which.

Figure 1:
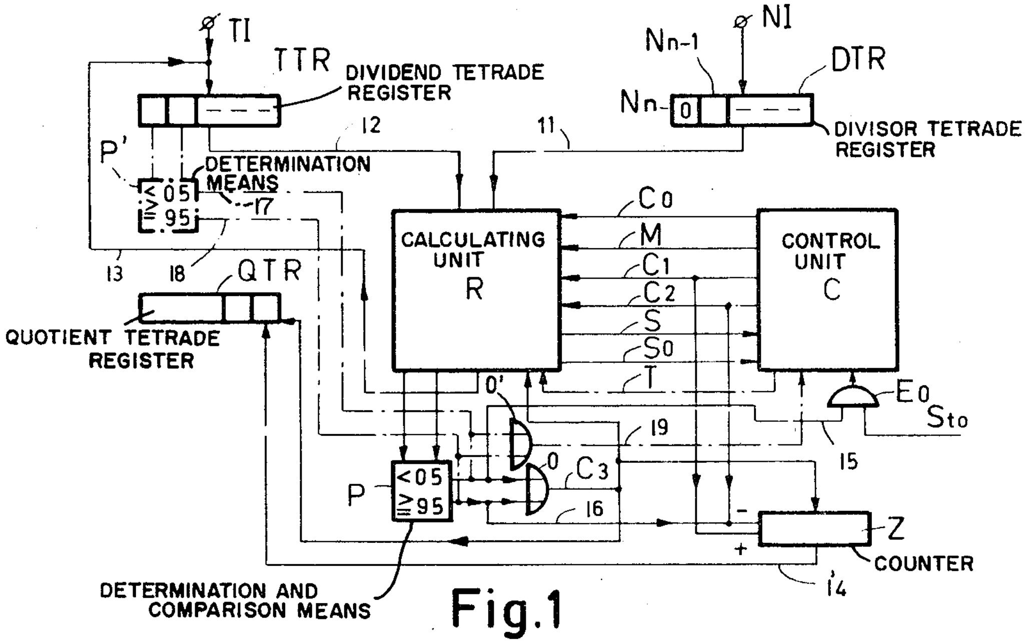
FIG. 1 shows an embodiment of a device according to the invention.

In FIG. 1, the letters DTR denote a divisor tetrade register having an input NI and an output via a line 11. The dividend tetrade register is denoted by TTR, and has an input TI, an input via line 13, and an output via line 12. It is to be emphasized, that for the invention, it makes no difference whether the numbers are processed and/or transported in parallel or in series form. In the case that transport is effected in series form, the said inputs TI and NI, and the lines 11, 12 and 13, may be singular. If the transport is effected in parallel form, NI, TI, 11, 12, 13 each represent a collection of inputs or lines, respectively.

Furthermore, R denotes a decimal calculating unit, C is a control unit, and QTR is a quotient tetrade register. C2 denotes a command line for add commands, C1 for subtract commands, and C3 for shift commands. Line 1' 4 serves to transport the quotient digits, successively formed in a quotient-forming counter Z having an add and a subtract input +/−, to the quotient tetrade register QTR. According to the invention, known means P are provided in this example, to determine whether during the dividing process, and in the calculating unit R, a remainder is formed whose digit of the highest order is a 0, and whose digit of the highest order but one is a number smaller that 5. It is also determined whether a remainder is formed, whose digit of the highest order is a 9, and whose digit of the highest order but one, is larger than, or equal to 5. In order to enable such a determination, the means P must consist of comparison circuits in which the digits are compared with the number 05 or 95, respectively. The means P are also used to determine, prior to the start of the dividing process, and in reaction to a command via a command line Co, whether the divisor digit stored in the tetrade N*n*− 1 of the highest order but one of the divisor tetrade register DTR, is smaller than the number 5. Also provided are an AND-function gate Eo, and an OR-function gate 0. There also is a command line M. The operation is as follows: first the dividend is stored in the dividend tetrade register TRR, and the divisor is stored in the divisor tetrade register DTR. The sign of the dividend and the divisor is processed according to known techniques, so as to determine the sign for the quotient; as this processing does not form part of the invention, it will not be elaborated upon in this context. Before the start of the dividing process, command line Co ensures that the divisor digit N*n*− 1 is tested in P, via the calculating unit R, whether it is smaller than the number 5. If this is the case, this information is applied to the control unit C via a line 15, and via the AND-function gate Eo, which is prepared by a signal on line *Sto*. The signal on Sto is present before the start of a division. This unit C then supplies multiplication commands via a line M. The contents of the divisor and the dividend tetrade register are then multiplied in the calculating unit R by a given factor. This factor may be, for example, 2. If the divisor digit N*n*− 1 does not yet satisfy the set requirement after multiplication by said factor, C supplies another command via M. It is alternatively possible, to determine at least how large the given factor must be in order to ensure, in one operation, that the set requirement for the divisor digit N*n*− 1 is satisfied. If this is desired, it can be ensured, after completion of a complete dividing process, that any remainder still present, which will be too large following such a multiplication, is corrected. Finally, there is a condition signalling line S via which, the calculating unit informs the unit C whether the remainder is positive or negative; on the basis thereof, a subtract command C1, or an add command C2, is supplied. There may also be a signalling line SO for announcing that the remainder is 0, after which the dividing process is stopped.

The operation of the device shown in FIG. 1 will be described in detail with reference to the calculation examples given in FIG. 2. It is to be noted, that any decimal points are not taken into account in this respect.

Figure 2:
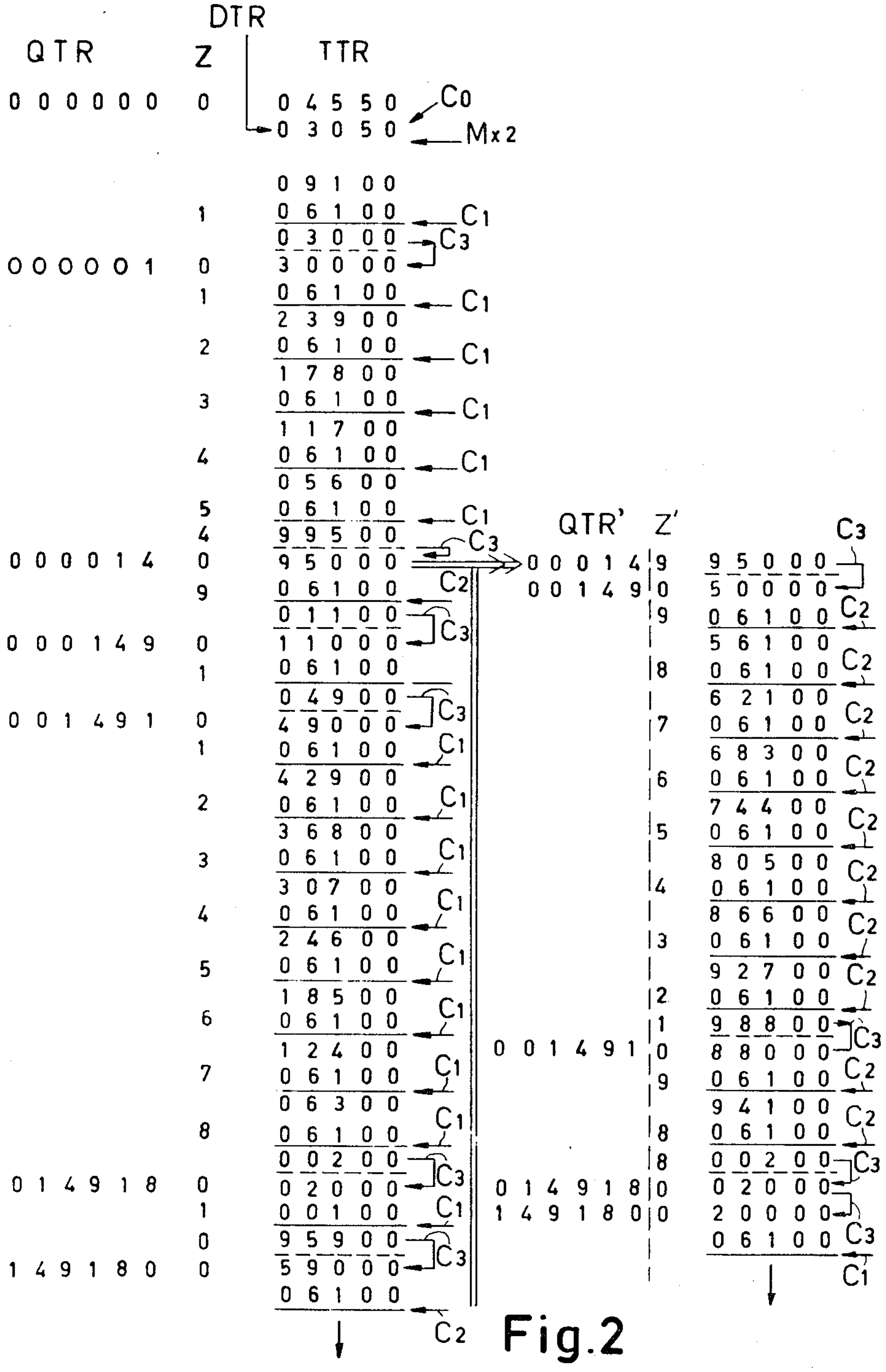
FIG. 2 shows an example of a division performed in the device shown in FIG. 1.

FIG. 2 shows the contents of the dividend tetrade register, and the divisor tetrade register TTR and NTR, respectively, and also those of the counter Z, and the quotient tetrade register QTR. Any intermediate results formed in the calculating unit R, which appear on the dividend tetrade register only after a shift, are underlined by a broken line. The commands occurring are stated at the right of the numerical examples.

In the example of FIG. 2, it is assumed that a dividend 455 is to be divided by a divisor 305. Both numbers are stored in known manner in the correct locations of the registers TTR and DTR, via inputs TI and NI, respectively. First, the command CO appears from unit C. Herewith, in this example, it is simply investigated, via the calculating unit, by the means P, in order to determine whether the N*n*− 1th digit of the divisor is <5. This is the case here. A signal is produced on line 15 which, because the start situation is involved, whereby Sto carries a signal, reaches the unit C via the AND-function gate EO. The unit C reacts to this signal on line 15 with a multiplication command M. It is assumed that M controls a multiplication by a factor of 2. This is performed in a normal and known manner. Consequently, TTR becomes 0910, and DTR becomes 0610. Another command CO causes no further signal on line 15 as the divisor digit N*n*− 1 is: 6 > 5. This means, that the pre-conditioning of dividend and divisor has been completed, and that the actual dividing process may start. The unit C then supplies a subtract command C1. The divisor is subtracted from the dividend and, moreover, the counter Z performs one step via input +. The remainder is 03 . . . . In P, it is signalled that the remainder is <05, so that a shift command C3 is produced (across OR-function gate 0). The following occurs in reaction to C3:

1. the remainder 030 . . . formed in the calculating unit R is shifted, via line 13, to a location whose order is one higher in register TTR, so 30 . . . , 2. the contents of counter Z, being a 1, are shifted to the tetrade of the lowest order of the quotient tetrade register QTR, while 3. the already present contents of QTR are shifted to a location whose order is one higher. Consequently, Z = 0 and QTR = 001. The remainder is still positive, so another subtract command C1 is given. In this case, this command is effected 5 times in succession, and then the remainder is negative: 995. In P, it is signalled that the remainder is ⩾ 95, so that a shift command C3 is formed. In reaction to this command, the following takes place:

1. via a line 16, first a 1-value is subtracted from the contents of the counter Z: signal across 16 on input −. Subsequently, the contents of Z become: 5− 1 = 4, 2. the remainder 995 formed in the calculating unit R is shifted, via line 13, to a location whose order is one higher in TRT, so 95 . . . , 3. the contents of counter Z, now being 4 since the above-mentioned operation (1), occurs somewhat before this operation (3), for example, due to the fact that the OR-function gate 0 introduces sufficient delay. These contents are shifted into the tetrade of the lowest order of QTR via 1′4, while 4. the already present contents of QTR are shifted to a location whose order is one higher. Then Z = 0, and QTR = 014.

Via line S, it is annunciated that the remainder has become negative, so unit C supplies an add command C2. Thereby the contents of counter Z, being 0 again, are reduced by one. Counter Z, thus performs a step backwards via input −, i.e. a 9 is produced. The divisor is added to the remainder, and a remainder 011 . . . is formed. This remainder being larger than 0, and in P, it is signalled that 01 < 05, so another shift command C3 is formed. Hereby, the remainder and the Z-counter contents (9) are shifted into QTR, whose previous contents are shifted over one location, etc.

Therefore, 16 add/subtract operations were required for the calculation of a quotient of 5 digits, in this case: 14918. According to the normal method, without preconditioning and the means P, 27 add/subtract operations would have been required.

However, in the above-mentioned example, the inventive device is not fully utilized. After the second shift command C3, a remainder 95000 is formed, which arrives in the calculating unit from the dividend tetrade register. An add command C2 is then given in the calculating unit. However, the remainder is ≥ 95, so actually a shift command could again occur. If this is realized in the device, this means that on the average, another saving in the number of subtract/add operations can be realized. The realization can be effected in different ways. A simple one is, for example, to connect to the dividend tetrade register TTR, in two locations of the highest order, a similar unit P, as is connected to the calculating unit. In FIG. 1, this unit is denoted by P′ by means of a stroke-dot line. If it appears in P′, that the first two digits of the remainder are <05 or ≧ 95, respectively, a signal appears from P′ on line 17 or 18, respectively, which connect the outputs of P′ to the outputs of P. Moreover, lines 17 and 18 are connected to an OR-function gate 0′, whose output is connected to the control unit C via line 19. If a signal appears on line 17 or 18, unit C receives a command, via 19, for transporting the contents of the register TTR to the calculating unit R, via line 12, and in particular, to a result (= output) register (not shown). For this purpose, a command line T is shown to depart from unit C. The signal appearing on 17 or 18, in addition, produces a shift command C3 across the OR-function gate 0. The connection of 17 and 18 to the outputs of P is not necessary in practice, because now it is established in P itself, that the remainder present on the output of the calculating unit is <05 or ≧ 95, respectively. This again results in a shift command C3.

On the other hand, it is also possible to make unit P′, using its outputs 17 and 18 and, output 19 after gate 0′, perform exactly the same as unit P, if 18 is connected to 16 in order to reach the counter Z. This arrangement will form the correct quotient digits. In this case, a shift command appears on line 19, which can ensure directly that the remainder is transferred, shifted over one location, from register TTR to the input of the calculating unit, via 12. The remainder is then available for a further subtract or add operation. This shift command also ensures that the relevant quotient digit is added as described above.

In this way, it is possible to shift the remainder twice in succession, and to store the associated quotient digits. In practice this is sufficient, as more than two possible shifts, and in particular three, occur only once every 1000 times on the average. The fact that in such a case, a number of additional subtract or add operations are to be performed, increases the mean calculation speed only slightly.

In the case of the said remainder 95000, P′ will cause a shift command C3. This is denoted in FIG. 2 by a double arrow at the right-hand side of the page. A different situation now arises: the quotient tetrade register has contents as given under QTR′, and the counter has a contents as given under Z′. Consequently, the immediately appearing shift command C3 ensures that:

1. via line 16, first a 1-value is subtracted from the contents of the counter: Z′ = 0−1 =9; 2. the remainder 95 . . . , then present on the output of the calculating unit, is shifted, via line 13, to a location whose order is one higher in TTR, so 5 . . . ; 3. the contents of the counter (now 9) are shifted to the location of the lowest order of QTR via *l*′4, and the already present contents (14) of QTR are shifted over one location, so that ultimately QTR′ contains 00149. The completion of the division is obvious, as will be seen from the further operations on the right-hand portion of the sheet of FIG. 2.

This appearance of a plurality of successive shift commands reduces the mean calculating time, which becomes apparent, particularly if results are produced in the calculating unit in the form of 000 . . . 0A . . . , or in the form of 999 . . . 9A. The largest number of shift commands, which is successively produced according to the method described above, is then equal to the number of zeros preceding A, which has to be <5, or is the number of shift commands which is equal to the number of nines preceding A, which has to be ≧ 5. respectively, If A is ≧ 5, in the case of zeros, or is ≦ 5 in the case of the nines, respectively, the number of successively appearing shift commands is one less than the number of zeros, or the number of nines, respectively. In this embodiment, each shift command C3, therefore, produces a shift over one digit tetrade.

It is still more efficient to produce a maximum possible shift using only one shift command. In this case, one shift command must be capable of directly shifting a remainder over a (one or more) number of digit tetrades, and of storing a corresponding number of quotient digits in the quotient tetrade register, independent of criterion regarding the value of the remainder produced in the calculating unit. This shifting, has to be such that not one or more transports of the remainder, each time shifted over one location, to the dividend tetrade register TTR, and then to the calculating unit, are again required. This is possible simply by considering not only the two result (= remainder) digits of the highest order on the output of the calculating unit, but also the digit of the third highest order, and possibly that of the fourth highest order, etc. In that case, it can be directly established over how many locations the remainder can be shifted into the dividend tetrade register in one operation, by means of one shift command, and how many quotient digits are then directly determined, and can be stored in the quotient tetrade register. This possibility will be described in detail hereinafter, with reference to FIG. 3.

Figure 3:
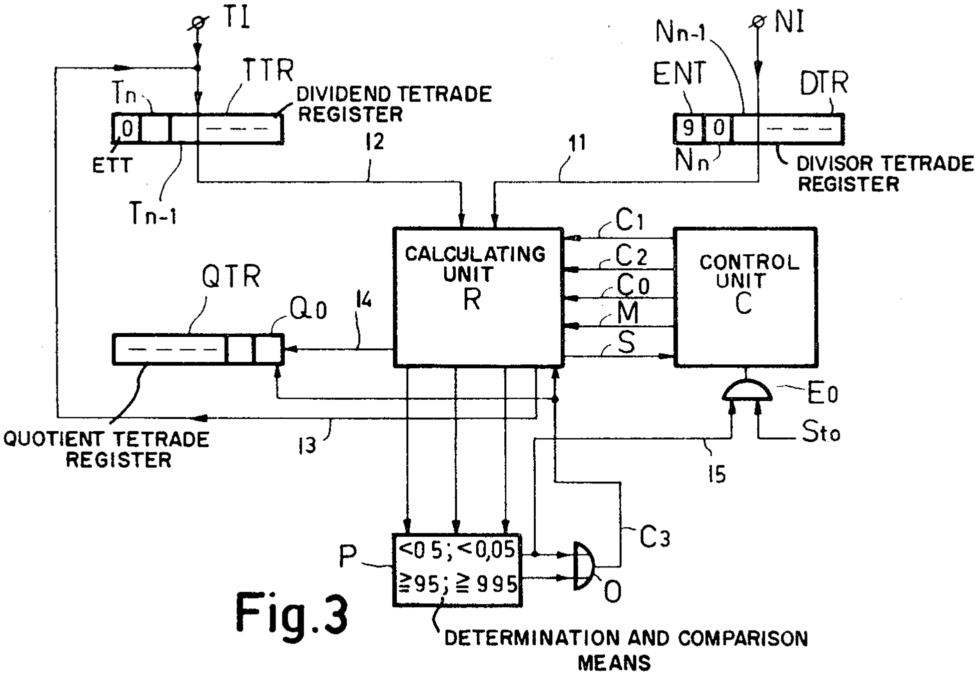
FIG. 3 shows a slightly modified embodiment of the device shown in FIG. 1.

FIG. 3 shows how the correct quotient digits are automatically and directly produced, when a minor modification is introduced in the device shown in FIG. 1. The counter Z is dispensed with. The lines 1'4 and 16 are also dispensed with. According to this modification, the divisor tetrade register DTR comprises an additional tetrade ENT in the location, whose order is one higher than the divisor digit of the highest order, which itself, is a 0. A digit 9 is permanently stored in said additional tetrade ENT. Similarly, the dividend tetrade register TTR comprises an additional tetrade ETT in the location, whose order is one higher than the location of the dividend digit of the highest order, a digit 0 being stored in the additional tetrade ETT upon the start of the division of two numbers. During conditioning of the dividend and the divisor, if necessary, the contents of ENT (and ETT) remain unchanged as the contents of ENT (and ETT) are not involved in a multiplication. In the actual dividing process, the contents of ENT and ETT are included in the already described operations, so that the correct quotient digit is automatically produced. This digit is shifted into the quotient tetrade register following a shift command from the calculating unit. In the device shown in FIG. 3, not only the two result (= remainder) digits of the highest order are taken into account in the unit P, as in FIG. 1, but also the digit of the third highest order. It is to be noted, that the contents of ETT are not included in this respect, as these contents are not considered in P. In FIG. 3, therefore, three connections are established between R and P. This is done to produce a shift command for shifting the remainder over, at the most, two digit tetrades, if a remainder appears of the form 00A ($A < 5$) or 99A ($A \geqq 5$). To this end, P comprises the necessary known comparison units, by means of which the situations $<05$ and $\geqq 95$, as well as $<005$ and $\geqq 995$, can be tested for the remainder digits of the highest order produced in the calculating unit.

Figures 4, 5:
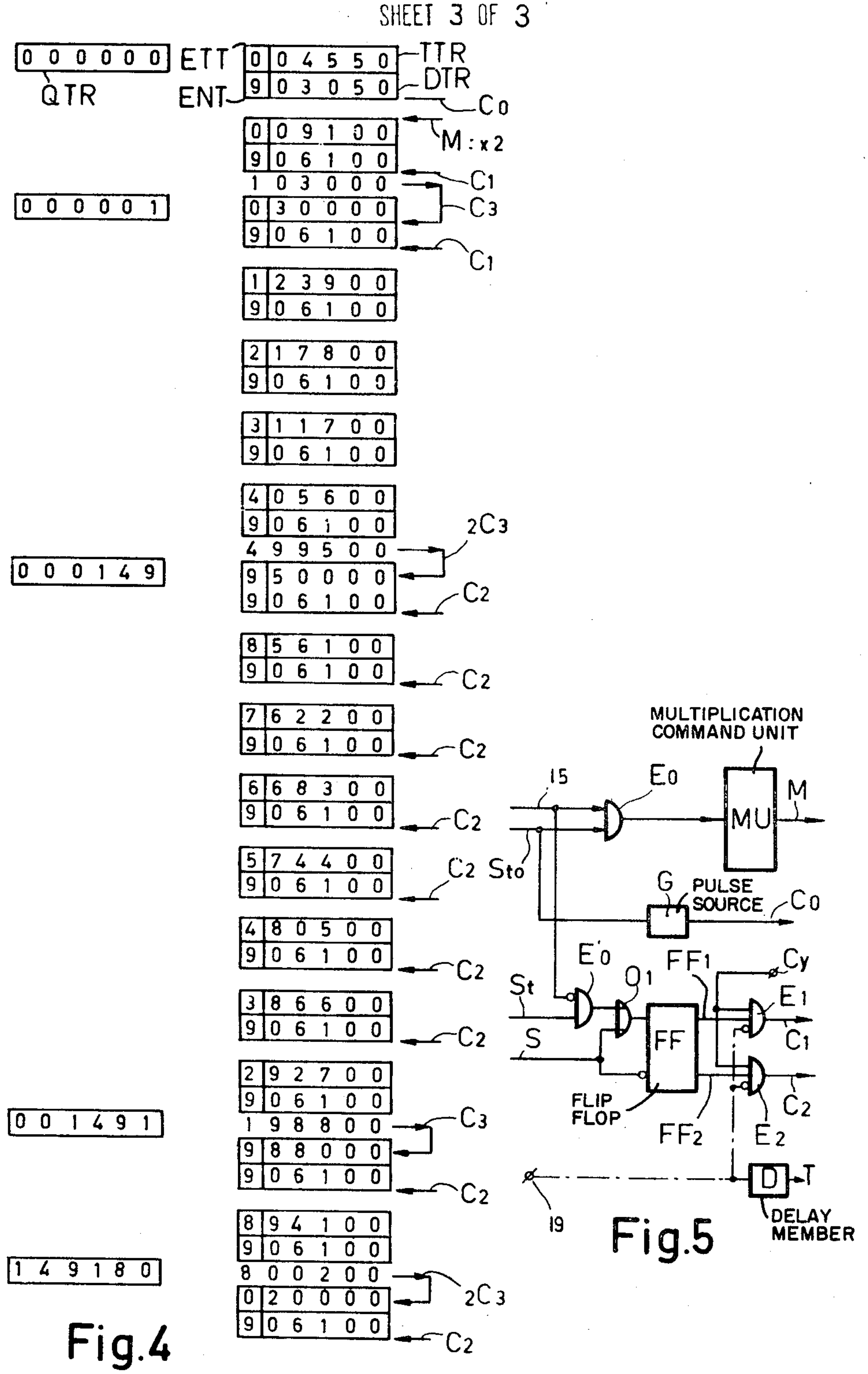
FIG. 4 shows an example of a division performed in the device shown in FIG. 3.
FIG. 5 shows a detail of the control unit used in the devices shown in FIGS. 1 and 3.

If one of the latter two situations occur, P supplies, instead of a shift command for a shift over one digit (tetrade), a shift command for shifting the remainder over two digit tetrades, two quotient digits are then directly transferred to the quotient tetrade register. This operation can be seen in the example of FIG. 4. The investigation of the three digits of the remainder of the highest order is sufficient, because in practice, a shift over more than two locations rarely occurs. See also the description with reference to FIG. 1. The operation of the device according to FIG. 3, is virtually identical to the operation of the device shown in FIG. 1, with the exception of the formation of the quotient digit. When a shift command appears, the changed or unchanged position of the counter Z (FIG. 1) is not shifted into the location of the lowest order of the quotient tetrade register QTR, but rather according to the system of FIG. 3, the correct quotient digit which is automatically formed in the calculating unit at this instant, is shifted into the aforementioned location. The calculating unit, then forms this quotient digit by including the contents of the additional tetrades ETT and ENT, in the subtract or add operations, respectively. To illustrate this, FIG. 4 shows the successive steps of the dividing process of two numbers. The example is the same as that of FIG. 2. As can be immediately seen, the contents of the additional tetrade ETT of the dividend tetrade register are changed each time, after an operation in the calculating unit, except when passing through zero. In reaction to shift commands C3, the result is shifted over one location from the calculating unit (to the left in the figure) into the dividend tetrade register. The correct quotient digit is then shifted into the location of the lowest order in QTR, by the shift command. For the remainder, this is the same as in FIG. 2, but when, for example, the result 4/99500 appears, unit P signals that, according to the abovementioned principle, a shift over two digit tetrades is possible. In FIG. 4, this is denoted by 2C3. The result is shifted two locations further, and the two "overflowing" digits 4 and 9 are shifted into the two locations of the lowest order of the quotient tetrade register. The numerical example is subsequently self-explanatory. FIG. 5, shows a detail of the devices shown in FIGS. 1 and 3, i.e. of the control unit C. In FIG. 5, MU denotes a multiplication command unit. 01 is an OR-function gate. E*o*, E'*o*, E1 and E2 are AND-function gates, and FF is a flipflop. G is, for example, a pulse source. Initially there is a starting signal on line Sto, which causes a command C*o*, as described above, as the output command via the pulse source G. If a signal appears on line 15 in reaction to the command C*o* (i.e. normalization is to be effected), AND-function gate Eo supplies a signal for unit MU, which effects the multiplication by giving a signal on the multiplication command line M. The starting signal *Sto* is followed, after a slight delay, by a starting signal St which, if no further signal is present on 15, denoted by a small circle at an input of AND-function gate E'*o*, causes a signal via AND-function gate E'*o* which is applied, via OR-function gate 01, to a set input of flipflop FF. The output FF1 then carries a 1-signal. When a calculating cycle pulse appears on Cy, a subtract command C1 appears across AND-function gate E1. As long as it is indicated via signalling line S, that the remainder formed in the calculating unit R remains positive, the flipflop remains in the said state and a subtract command C1 is given in reaction to every cycle pulse appearing on Cy. If the remainder becomes negative, the signalling line carries no further signal in this example. The change-over on line S at the instant that the remainder becomes negative, ensures that the flipflop is reset. The output FF2 then carries a 1-signal. In a reaction to every pulse on Cy, an add command C2 is then formed across the AND-function gate E2. If the remainder becomes positive again after one or more commands C2, the change-over then occurring on line S causes a reversal of the flipflop FF, via the OR-function gate 01, so that subsequently subtract commands C1 will be given, etc.

The stroke-dot line in FIG., 5 illustrates how the unit C is slightly modified in order to enable the appearance of more than one shift command in succession (as described with reference to FIG. 1), if the remainder necessitates such a succession. This is because, if a C3 command is caused by a signal on 17 or 18, this signal appears also in unit C via OR-function gate 0', and line 19. This takes place in an inverted form on AND-function gates E1 and E2, so that, if this signal appears on 17 or 18, no C1 or C2 command can appear, when a pulse appears on Cy. This is because first, for example, via a member D having a small delay, a command signal is produced on line T for transporting the remainder from TTR directly to the output register of the calculating unit R, or for shifting the remainder over one location from the dividend tetrade register TTR to the input of the calculating unit; see for both cases, the description with reference to FIG. 1. If no further shift occurs, the signal on 17 or 18 is absent, the AND-function gate E1 or E2 can supply a subtract or add command C1 or C2, respectively, in reaction to a pulse on Cy.

What is claimed is:

1. A calculating device for dividing decimal numbers according to a method of division which does not restore a remainder, said device comprising a divisor tetrade register for storing divisor digits, the divisor digit of a highest order being a 0, a dividend tetrade register for storing dividend digits or, after a subtraction or an addition of a divisor, stores remainder digits, a quotient tetrade register for storing quotient digits, a calculating unit connected to the latter registers and a control unit connected to said calculating unit which supplies, if a dividend or a remainder is positive, a command to the calculating unit for performing a subtraction of contents of the divisor tetrade register from contents of the dividend tetrade register, or, if a remainder is negative, a command for performing an addition of the contents of the divisor tetrade register to the contents of the dividend tetrade register, means connected to said calculating unit for establishing, prior to the start of the dividing process, whether the divisor digit present in the tetrade of the highest order less one of the divisor tetrade register is smaller than 5, said means, if this is the case, supplying a command for multiplication of the dividend and the divisor by a given factor, such that after one or more multiplication operations, the said divisor digit is larger than, or at least equal to 5, and means connected to said calculating unit for supplying, if a remainder is $<05$ or $\geq 95$, respectively, a shift command during the dividing process for shifting the remainder into a digit tetrade of a higher order and for shifting the associated quotient digit into the tetrade of a lowest order of the quotient tetrade register.

2. A calculating device as claimed in claim 1, wherein said shift command serves for shifting a remainder formed in the calculating unit over a number of digit tetrades of a higher order in the dividend tetrade register, and for storing a corresponding number of associated quotient digits in the quotient digit tetrades of the lowest order of the quotient tetrade register, the maximum number of digit tetrades being equal to the number of digits of those digits of the highest order of the remainder, that containing a digit 0 followed by a digit smaller than 5, or containing a digit 9 followed by a digit which is larger than, or equal to 5, said maximum number of digit tetrades furthermore being equal to the number of digits of the digits of the highest order of the remainder reduced by one, containing a digit 0 followed by a digit larger than, or equal to 5, or containing a digit 9 followed by a digit smaller than 5.

3. A calculating device as claimed in claim 2, wherein the divisor tetrade register comprises an additional tetrade in the location whose order is one higher than the location of the divisor digit of the highest order (0), a digit 9 being permanently stored in said additional tetrade, the dividend tetrade register comprising an additional tetrade in the location whose order is one higher than the location of the dividend (remainder) digit of the highest order, a digit 0 being stored in the latter additional tetrade at the start of a division, the add or subtract operations, respectively, in the calculating unit, also involving contents of said additional tetrades, and automatically producing the correct quotient digit, said quotient digit being shifted into the quotient tetrade register in reaction to a shift command.

* * * * *